(12) United States Patent
Ko

(10) Patent No.: US 11,867,587 B2
(45) Date of Patent: Jan. 9, 2024

(54) SYSTEM AND METHOD FOR VIBRATION INSPECTION OF VEHICLE

(71) Applicants: Hyundai Motor Company, Seoul (KR); Kia Motors Corporation, Seoul (KR)

(72) Inventor: Hyuk Ko, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 666 days.

(21) Appl. No.: 17/069,051

(22) Filed: Oct. 13, 2020

(65) Prior Publication Data
US 2021/0302271 A1    Sep. 30, 2021

(30) Foreign Application Priority Data

Mar. 26, 2020  (KR) ......................... 10-2020-0036568

(51) Int. Cl.
| | |
|---|---|
| *B25J 13/06* | (2006.01) |
| *G01M 17/007* | (2006.01) |
| *G01P 15/18* | (2013.01) |
| *G07C 5/08* | (2006.01) |
| *B62D 65/00* | (2006.01) |
| *B25J 13/08* | (2006.01) |

(52) U.S. Cl.
CPC ......... *G01M 17/0078* (2013.01); *B25J 13/06* (2013.01); *B25J 13/087* (2013.01); *B62D 65/005* (2013.01); *G01P 15/18* (2013.01); *G07C 5/0825* (2013.01)

(58) Field of Classification Search
CPC .... G01M 17/0078; B25J 13/06; B25J 13/087; B62D 65/005; G01P 15/18; G07C 5/0825
See application file for complete search history.

(56) References Cited

U.S. PATENT DOCUMENTS

| | | | | |
|---|---|---|---|---|
| 4,989,455 | A * | 2/1991 | Gomyo | G01N 3/36 73/669 |
| 5,551,298 | A * | 9/1996 | Rayment | G01M 17/0078 73/579 |
| 6,481,271 | B1 * | 11/2002 | Ward | G01M 17/007 73/118.01 |
| 7,971,486 | B2 * | 7/2011 | Melz | G01M 7/06 73/11.04 |

(Continued)

*Primary Examiner* — Kira Nguyen
(74) *Attorney, Agent, or Firm* — MORGAN, LEWIS & BOCKIUS LLP

(57) ABSTRACT

A system for vibration inspection of a vehicle for inspecting a quality of the vehicle assembled in a vehicle factory's in-line may include an inspection table for guiding and fixing the vehicle to a predetermined inspection position, a sensor detachable robot configured for attaching or detaching vibration sensors to various parts of the vehicle, a vibrating robot configured of generating vibration for the vibration inspection of the vehicle, and an inspection server that analyzes the vibration signal received from the vibration sensor during the vibration inspection of the vehicle, and determines the vehicle to be in inspection pass if the vibration signal matches the normal signal set according to a natural vibration frequency characteristic of each part of the vehicle, and determines the vehicle to be in inspection fail if the vibration signal does not match the normal signal.

18 Claims, 7 Drawing Sheets

(56) References Cited

U.S. PATENT DOCUMENTS

| | | | |
|---|---|---|---|
| 2003/0154054 A1* | 8/2003 | Charette | G01M 17/007 |
| | | | 702/188 |
| 2016/0018294 A1* | 1/2016 | Moriya | G01M 17/04 |
| | | | 73/11.07 |
| 2017/0358151 A1* | 12/2017 | Koons | G07C 5/08 |
| 2020/0132567 A1* | 4/2020 | Wheeler | G06F 17/142 |
| 2021/0033495 A1* | 2/2021 | Akutsu | G01M 17/045 |
| 2021/0206579 A1* | 7/2021 | Freitas | B25J 5/007 |
| 2021/0213479 A1* | 7/2021 | Grass | B25J 15/08 |

* cited by examiner

SYSTEM AND METHOD FOR VIBRATION INSPECTION OF VEHICLE

CROSS-REFERENCE TO RELATED APPLICATION

The present application claims priority to Korean Patent Application No. 10-2020-0036568 filed on Mar. 26, 2020, the entire contents of which is incorporated herein for all purposes by this reference.

BACKGROUND OF THE INVENTION

Field of the Invention

The present invention relates to a system and a method for vibration inspection of a vehicle. More particularly, the present invention relates to a system and a method for vibration inspection of a vehicle for inspecting the quality of an assembled vehicle through vibration signal measurement.

Description of Related Art

In general, in-line of a vehicle factory performs a vehicle inspection to inspect the quality of a vehicle that has been assembled.

The conventional vehicle inspection includes a visual inspection dependent on an operator, a laser scanning inspection that measures the specifications of the vehicle, a test driving inspection, and the like, and for example, an assembly quality inspection is performed in-line through torque measurement.

However, the conventional visual inspection and test driving inspection depend on the skill level (experience value) of the operator and human error may occur, and the scanning inspection has a limitation in that a comprehensive analysis inspection of all parts belonging to the vehicle is insufficient. As a result, there is a problem that quality problems that cannot be confirmed or cannot be confirmed occur when the vehicle is delivered to the customer.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and a method for vibration inspection of a vehicle in which confirms that abnormal conditions of parts and systems may be detected and corrected through vibration inspection for each part using the vehicle's natural vibration characteristics.

Furthermore, various aspects of the present invention are directed to providing a system and a method for vibration inspection of a vehicle for diagnosing the location and cause of a problem during a vibration inspection by learning the result data accumulated according to the vehicle vibration inspection through deep learning.

According to various exemplary embodiments of the present invention, a system for vibration inspection of a vehicle for inspecting a quality of the vehicle assembled in a vehicle factory's in-line includes an inspection table for guiding and fixing the vehicle to a predetermined inspection position, a sensor detachable robot configured for attaching or detaching vibration sensors to various parts of the vehicle, a vibrating robot configured of generating vibration for the vibration inspection of the vehicle, and an inspection server that analyzes the vibration signal received from the vibration sensor during the vibration inspection of the vehicle, and determines the vehicle to be in inspection pass (pass) if the vibration signal matches the normal signal set according to a natural vibration frequency characteristic of each part of the vehicle, and determines the vehicle to be in inspection fail (fail) if the vibration signal does not match the normal signal.

Furthermore, the system for vibration inspection of a vehicle may further include a vehicle recognizer configured for recognizing a barcode or On-board diagnostics (OBD)-ID of the vehicle entering the inspection table and transmitting the recognized barcode or the OBD-ID to the inspection server.

Furthermore, the inspection table may include access roads for guiding the vehicle to enter wheels of the vehicle and a stopper protruding from the front of the access roads to fix both the wheels at a predetermined position, and a plurality of sensor detachable robots is disposed around the inspection table.

Furthermore, the inspection table may further include a space part formed below the access roads, and a sensor detachable robot configured for attaching or detaching the vibration sensor may be disposed under the vehicle in the space part.

Furthermore, the vibration sensor may be configured in plural and may be attached to the vehicle through a magnet and is configured to measure vibration signals of various attached parts.

Furthermore, the vibration sensor may include a three-axis acceleration sensor that is configured to measure a vibration signal in which the vehicle is vibrated upwards and downwards, back and forth, and left and right of the vehicle.

Furthermore, the vibration sensor may have a wired or wireless communication means and transmits the measured vibration signal to the inspection server through each unique communication channel.

Furthermore, the sensor detachable robot may grip the vibration sensor with tongs mounted on an end effector of the sensor detachable robot in a multi-joint structure, attach it to a set part of the vehicle through posture control of the sensor detachable robot, or removes the vibration sensor after a vibration inspection.

Furthermore, the vibrating robot may generate vibrations by vibrating a vibrator mounted on an end effector of a multi-joint structure on the vibrating robot in close contact with the vehicle or hitting a part set as a hammer.

Furthermore, the inspection server may include an external interface unit for receiving a vibration signal for each unique communication channel connected to the vibration sensor, including wired and wireless communication modules, a vehicle recognition unit of determining whether the vehicle is entered and a vehicle type and specifications of the entered vehicle ID using the barcode or ODD-ID received from the vehicle recognizer of the inspection table, a robot control unit of controlling the sensor detachable robot to attach the vibration sensor to a portion of the vehicle set according to the vehicle type and specifications of the vehicle, a data setting unit configured to set a normal signal according to a natural vibration frequency characteristic of each part set for each vehicle type and specification of the vehicle and reference data in which a range criteria thereof is defined, a display unit that provides an operator input menu (UI) to display a plurality of types of information generated according to the vibration inspection of the vehicle, a database unit (DB) for storing various programs and data for the vibration inspection of the vehicle, and a control unit that is configured to detect an abnormal state of a component or a system of the vehicle in which an abnormal signal is generated for each unique communication channel, diagnoses a location and a cause of the component where the abnormal state has occurred, and displays the abnormal state on the display unit.

Furthermore, the robot control unit may control the vibrating robot to make a vibrator be in close contact with the vehicle and vibrates the vehicle via the vibrator.

Furthermore, the control unit may compare a frequency peak and a magnitude of the abnormal signal based on the normal signal to determine a frequency variation characteristics, and compare the frequency variation characteristics of the abnormal signal with a failure determination model of a plurality of cases stored in the diagnostic data to analyze a cause of abnormality of the component or the system.

Furthermore, the control unit may generate a new failure determination model by learning the abnormal signal with a deep learning neural network and update diagnostic data in which a new cause of abnormality is defined when a failure determination model having a pattern corresponding to the frequency variation characteristics of the abnormal signal is not detected in the diagnostic data.

Meanwhile, a method for vibration inspection of a vehicle for inspecting a quality of the vehicle assembled in a vehicle factory's in-line according to various exemplary embodiments of the present invention includes a) determining a type and a specification of the vehicle according to the vehicle ID recognized through the vehicle recognizer when the vehicle enters the inspection table, b) controlling a sensor detachable robot having a multi-joint structure to attach a vibration sensor for each part set according to a vehicle type and specification of the vehicle, c) controlling a robot having a multi-joint structure to make a vibrator be in close contact with the vehicle and vibrating the vibrator for the vibration inspection of the vehicle, and d) analyzing the vibration signal received from the vibration sensor and determining the vehicle to be in inspection pass (pass) if the vibration signal matches the normal signal set according to a natural vibration frequency characteristic of each part of the vehicle, and determining to be inspection fail (fail) if the vibration signal does not match the normal signal.

Furthermore, the step b) may include attaching the vibration sensors matched to the set parts through posture control for each of the sensor detachable robots mounted around the inspection table and returning the at least a vibration sensor to an original position thereof.

Furthermore, the step d) may include classifying and storing the received vibration signal for each unique communication channel connected to the vibration sensor attached to each part when the vehicle vibrates, and analyzing the vibration signal for each unique communication channel to determine whether the vibration signal matches the normal signal set for each part.

Furthermore, after the step d), the method for vibration inspection of a vehicle may further include e) detecting an abnormal part among the set parts through a unique communication channel in which an abnormal signal is received and displaying on a display unit according to the diagnosis data learned by deep learning in advance, the parts belonging to the abnormal part and the cause of the abnormality are diagnosed.

Furthermore, in the step e), the fluctuation characteristic may be determined by comparing the frequency peak and the magnitude of the abnormal signal based on the normal signal, and the cause of the abnormality may be analyzed by comparing frequency variation characteristics of the abnormal signal with failure determination models of various cases stored in the diagnostic data.

Furthermore, the step e) may include displaying an abnormal state defined in the fault determination model through the display unit when a fault determination model having a pattern corresponding to the frequency variation characteristics of the abnormal signal is detected in the diagnostic data.

Furthermore, the step e) may include determining a new cause of an abnormality of a corresponding part of the vehicle through maintenance of a vehicle when a failure determination model having a pattern similar to the frequency variation characteristics of the abnormal signal is not detected in the diagnostic data, and learning the abnormal signal by deep learning to generate a new failure determination model, and updating the diagnostic data in which the new cause of the abnormality is defined.

According to various exemplary embodiments of the present invention, human errors due to automation of vehicle inspection can be prevented by measuring vibration signals by attaching vibration sensors to various parts of the vehicle through a multi-joint robot and detecting the analyzed abnormal state according to the natural vibration frequency characteristics of each part.

Furthermore, it is possible to improve diagnostic performance for abnormal situations in various cases for each part by updating the diagnosis data by learning new abnormal signals detected in the vehicle diagnostic test process through deep learning neural network learning.

Furthermore, comprehensive inspection of various parts applied by vehicle type is possible by performing customized vibration inspection set according to various vehicle types and specifications produced in the in-line process.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
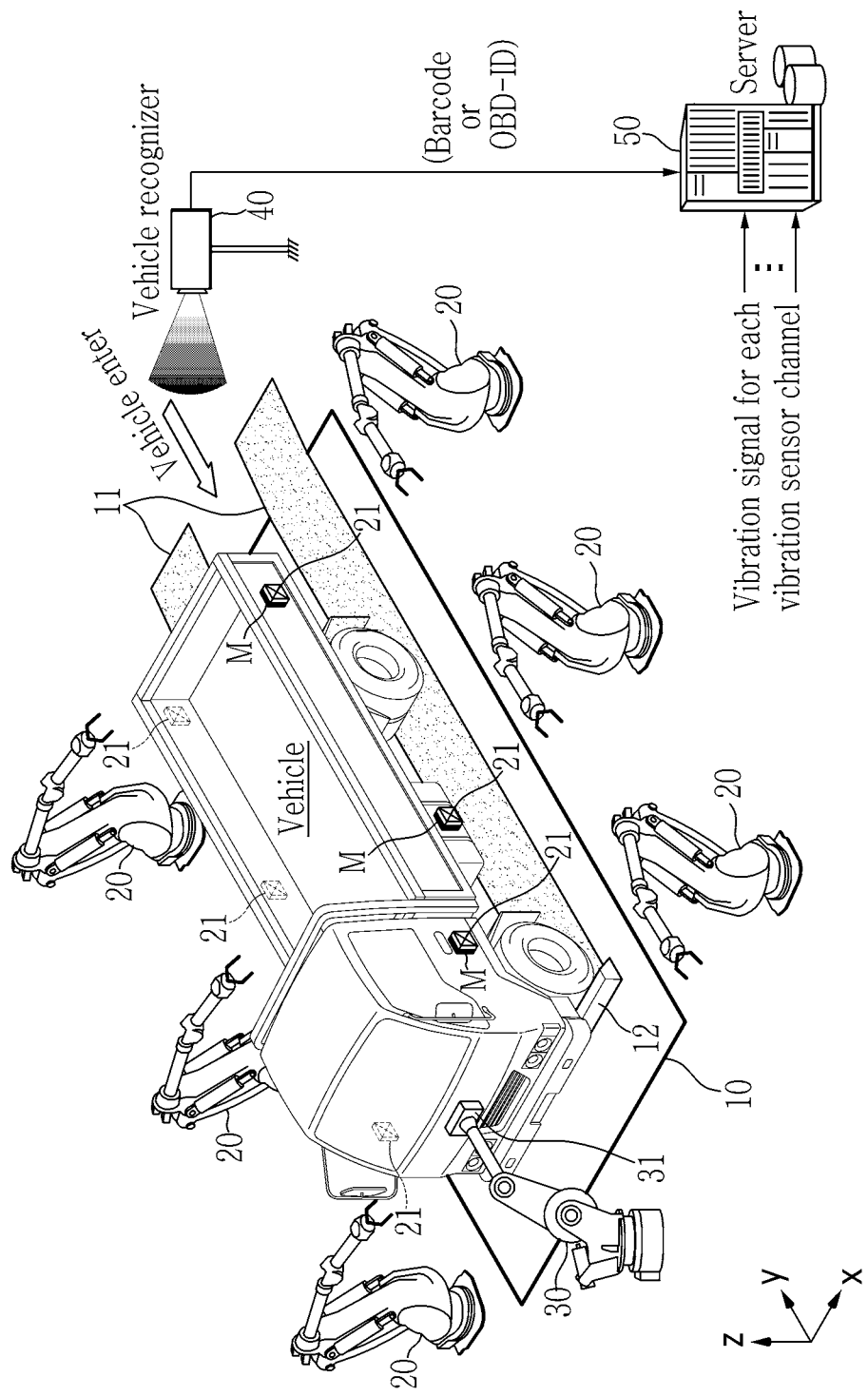
FIG. 1 is a perspective schematic view showing the configuration of a vehicle vibration inspection system according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

Throughout the specification, terms such as first, second, 'A', 'B', '(a)', '(b)', and the like will be used only to describe various elements, and are not to be interpreted as limiting these elements. These terms are only for distinguishing the constituent elements from other constituent elements, and nature or order of the constituent elements is not limited by the term.

It will be understood that when an element is referred to as being "connected," or "coupled," to another element throughout the specification, it may be directly connected or coupled to the other element or intervening elements may be present. In contrast, when an element is referred to as being "directly connected," or "directly coupled," to another element, there are no intervening elements present.

A system and a method for vibration inspection of a vehicle according to various exemplary embodiments of the present invention will now be described in detail with reference to the drawings.

FIG. 1 is a perspective schematic view showing the configuration of a vehicle vibration inspection system according to various exemplary embodiments of the present invention.

Figure 2:
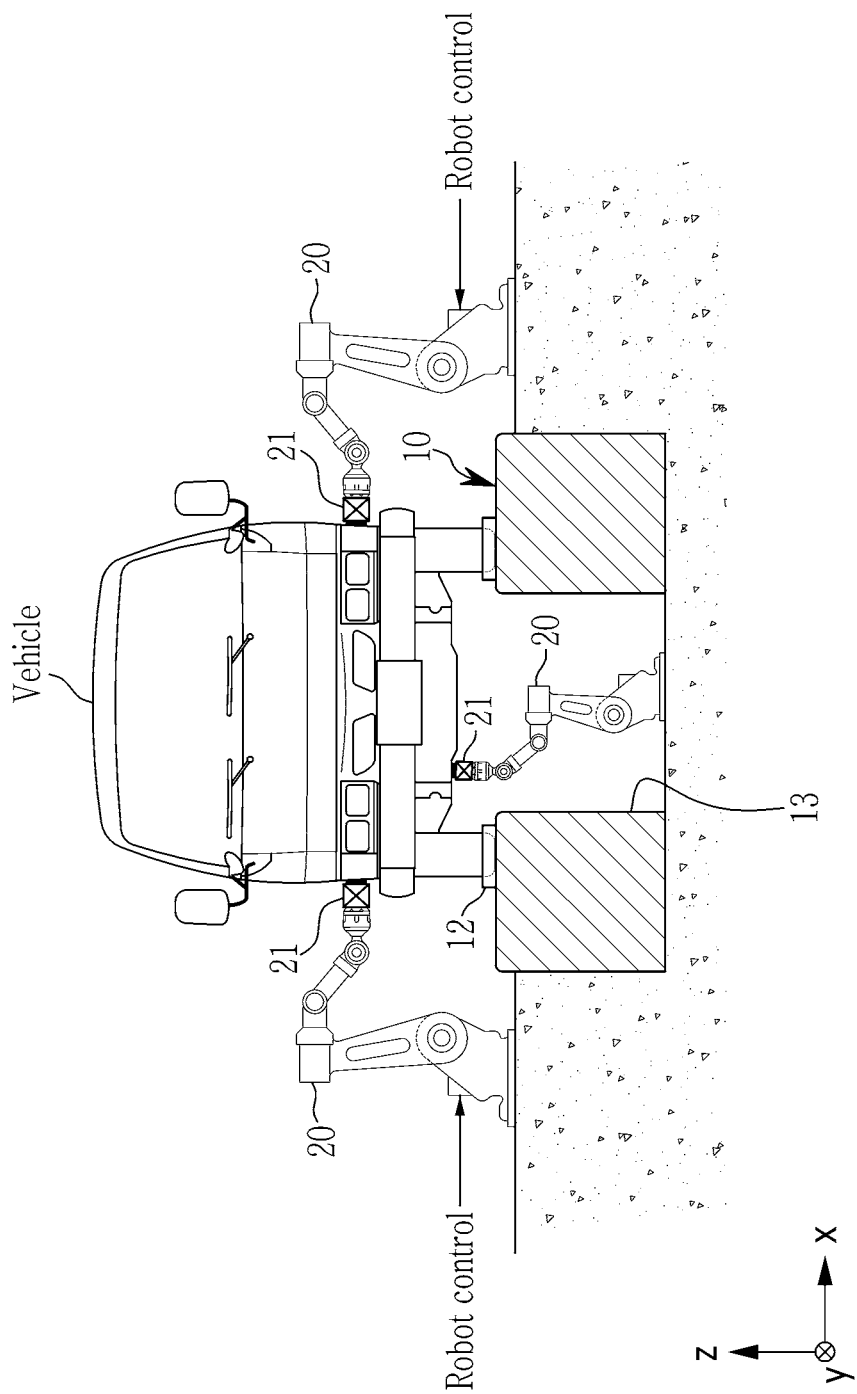
FIG. 2 is a cross-sectional view of a vehicle vibration inspection system according to various exemplary embodiments of the present invention as viewed from the front.

FIG. 2 is a cross-sectional view of a vehicle vibration inspection system according to various exemplary embodiments of the present invention as viewed from the front.

Referring to FIG. 1 and FIG. 2, a system for vibration inspection of a vehicle according to various exemplary embodiments of the present invention may be provided in the vehicle factory's in-line, and may include an inspection table 10, a vibration sensor 21, a sensor detachable robot 20, a vehicle recognizer 40, and an inspection server 50.

The inspection table 10 is a base for guiding and fixing an inspection target vehicle (hereinafter, referred to as "vehicle" for convenience) to a predetermined inspection position. In the vehicle factory's in-line according to various exemplary embodiments of the present invention, a plurality of vehicle types and a plurality of option vehicles may be produced, therefore, vehicles of various specifications, such as a truck, a passenger car, a sports utility vehicle, an electric vehicle, a hybrid vehicle, and a hydrogen vehicle, may enter the inspection table 10.

The inspection table 10 includes access roads 11 for guiding the vehicle to enter both wheels, a stopper 12 protruding from the front of the access roads 11 to fix both the wheels at a predetermined position, and a space part 13 formed below the access roads 11.

The vibration sensor 21 is configured in plural and is configured to measure vibration signals of various parts of the vehicle attached through the magnet M. Here, the part means a specific position of a component applied to the vehicle.

The vibration sensor 21 may include a three-axis acceleration sensor that is configured to measure a vibration signal that the vehicle is vibrated upwards and downwards (vertical direction), back and forth (longitudinal direction), and left and right (crossing direction).

The vibration sensor 21 has a wired or wireless communication means and transmits the measured vibration signal to the inspection server 50 through each unique communication channel ch. The inspection server 50 side can grasp the vibration sensor 21 corresponding to the vibration signal and the attachment part through the unique communication channel ch of the communication means.

Furthermore, the vibration sensor 21 is not limited to the above description and may transmit the measured vibration signal to the inspection server 50 through a communication connection with the sensor detachable robot 20. The communication means may include at least one of Bluetooth, wireless LAN, and serial communication.

The sensor detachable robot 20 is disposed around the inspection table 10 in a multi-joint structure, and attaches at least one vibration sensor 21 to a set portion of the vehicle, respectively, for vibration inspection of the vehicle.

The sensor detachable robot 20 grips the vibration sensor 21 with forceps mounted on an end effect of a multi-joint structure during a vibration inspection, and may be attached to the set portion through posture control or removed after a vibration inspection.

In FIG. 1, it is expressed that the sensor detachable robot 20 is disposed on the left and right sides of the vehicle, but the number is not limited thereto. Furthermore, as shown in FIG. 2, the sensor detachable robot 20 may be disposed in the space part 13 formed under the inspection table 10 to attach the vibration sensor 21 to a component located under the vehicle.

Here, vehicles of various vehicle types and specifications may enter the inspection table 10. The sensor detachable robot 20 is controlled to attach the vibration sensor 21 to a pre-set (determined) attachment portion corresponding to the vehicle type and specifications of the vehicle entering the inspection table 10 through the robot control unit.

The vibrating robot 30 has a multi-joint structure as above, and the vibrator 31 mounted on the end effector of vibrating robot 30 is in close contact with the vehicle and vibrates for a vibration inspection.

The vibrating robot 30 may apply constant up and down (vertical direction), back and forth (longitudinal direction), and left and right (crossing direction) excitation signals to the vehicle through the vibrator 31. Here, in FIG. 1, although the vibrating robot 30 is shown to be disposed in front of the vehicle, the exemplary embodiment of the present invention is not limited thereto, and may be configured in plural and further disposed at the side or rear of the vehicle. However, when located in the rear, the vibrating robot 30 may be configured to be movable left and right so as not to interfere with the entry of the vehicle.

On the other hand, the vibrating robot 30 is not limited to the structure provided with the vibrator 31 and may have a structure in which a hammer is mounted on the end effector. At the instant time, the vibrating robot 30 may generate vibration by tapping a set portion with a hammer for vibration inspection.

The vehicle recognizer 40 is provided with at least one of a barcode scanner, an RFID reader, and a wireless antenna to recognize the ID (unique number or VIN) of a vehicle entering the inspection table 10 and transmits it to the inspection server 50.

The inspection server 50 is a computing system that centrally controls the operation of the above-described vehicle vibration inspection facility to perform a vibration inspection of a vehicle according to various exemplary embodiments of the present invention.

The inspection server 50 analyzes the vibration signal received from the vibration sensor 21 during the vibration inspection of the vehicle, and determines as inspection pass if it matches the normal signal set according to a natural vibration frequency characteristic of each part of the vehicle. On the other hand, when an abnormal signal which is inconsistent with the normal signal is detected, the inspection server 50 determines as inspection fail. In addition, it is possible to diagnose the occurrence part and cause of the abnormal signal based on diagnosis data learned in advance through deep learning.

Figure 3:
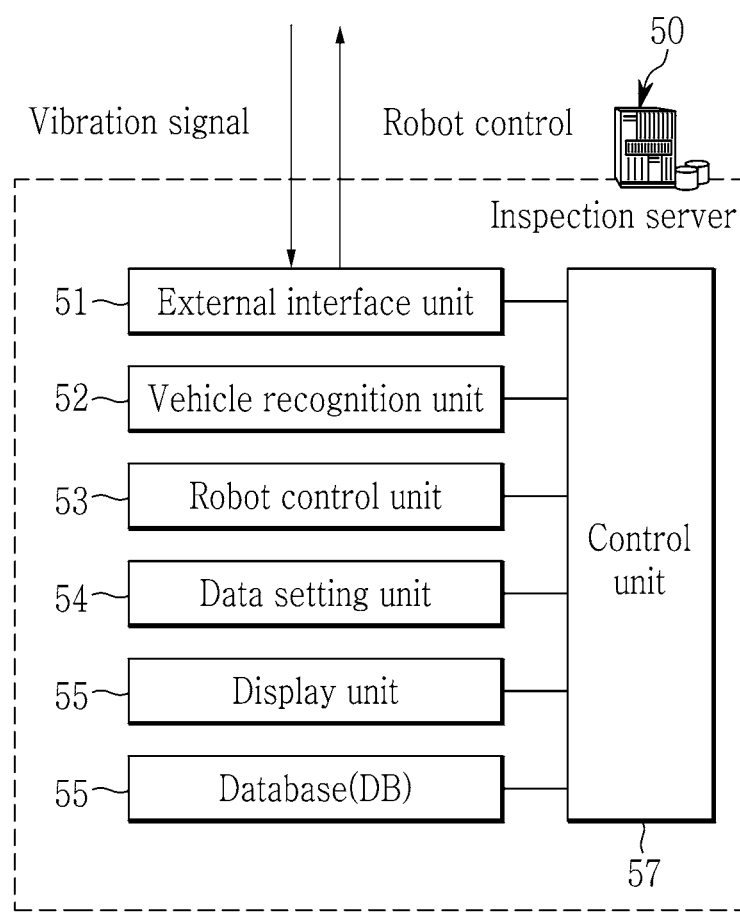
FIG. 3 is a block diagram schematically showing the configuration of an inspection server according to various exemplary embodiments of the present invention.

FIG. 3 is a block diagram schematically showing the configuration of an inspection server according to various exemplary embodiments of the present invention.

Referring to FIG. 3, the inspection server 50 includes an external interface unit 51, a vehicle recognition unit 52, a robot control unit 53, a data setting unit 54, a display unit 55, a database (DB, 56), and a control unit 57.

The external interface unit 51 includes wired and wireless communication modules for communication with each of the vibration sensors 21, each of the robots 20 and 30, and the vehicle recognizer 40.

The external interface unit 51 distinguishes each vibration signal received for each unique communication channel ch connected to the vibration sensor 21 and transmits it to the control unit 57.

The vehicle recognition unit 52 identifies the vehicle type and specifications (option) of the vehicle ID (VIN) matched to the barcode or OBD-ID received from the vehicle recognizer 40.

The robot control unit 53 includes a plurality of robot control modules for controlling a robot corresponding to each of the robots 20 and 30.

The robot control unit 53 controls each sensor detachable robot 20 to attach the vibration sensor 21 to each set portion according to the identified vehicle type and specification.

Furthermore, when the attachment of the vibration sensor 21 is completed, the robot control unit 53 controls the vibrator 30 to bring the vibrator 31 into close contact with the vehicle, and vibrates the vehicle for vibration inspection. At the instant time, the same vibration is input to the vehicle, but the vibration signals for each part appear differently according to the natural vibration frequency characteristics of the parts assembled in the vehicle.

The data setting unit 54 sets a normal signal according to the natural vibration frequency characteristic of a part (part) set for each vehicle type and specification of the vehicle and reference data in which the range criteria are defined.

Furthermore, the data setting unit 54 learns in advance the abnormal signals of various cases and the abnormal phenomena and fault details caused by the frequency transformation of the various cases through a neural network of deep learning. Accordingly, the diagnostic data on which the failure determination model is built is stored.

The display unit 55 provides an input menu (UI) for operation of the inspection server 50 and displays various types of information generated according to the vibration inspection of the vehicle through the display.

The display unit 55 may display inspection information to an operator in connection with not only a display, but also a laptop, tablet PC, and smartphone connected through the external interface unit 51.

The DB 56 stores various programs and data for operation of the inspection server 50, and stores various information generated according to the operation.

The control unit 57 controls the overall operation of each part for vibration inspection of a vehicle according to various exemplary embodiments of the present invention.

The control unit 57 detects an abnormal state of a component or system through a vibration inspection for each part using the vehicle's natural vibration characteristics. Furthermore, the control unit 57 diagnoses the location and cause of the component in which the abnormal state has occurred based on diagnostic data built through deep learning.

For the present purpose, the control unit 57 may be implemented with one or more processors operated by a set program, and the set program may be programmed to perform each step of the method for vibration inspection of a vehicle according to various exemplary embodiments of the present invention. The method for vibration inspection of a vehicle will be described in more detail with reference to the drawings below.

Figure 4:
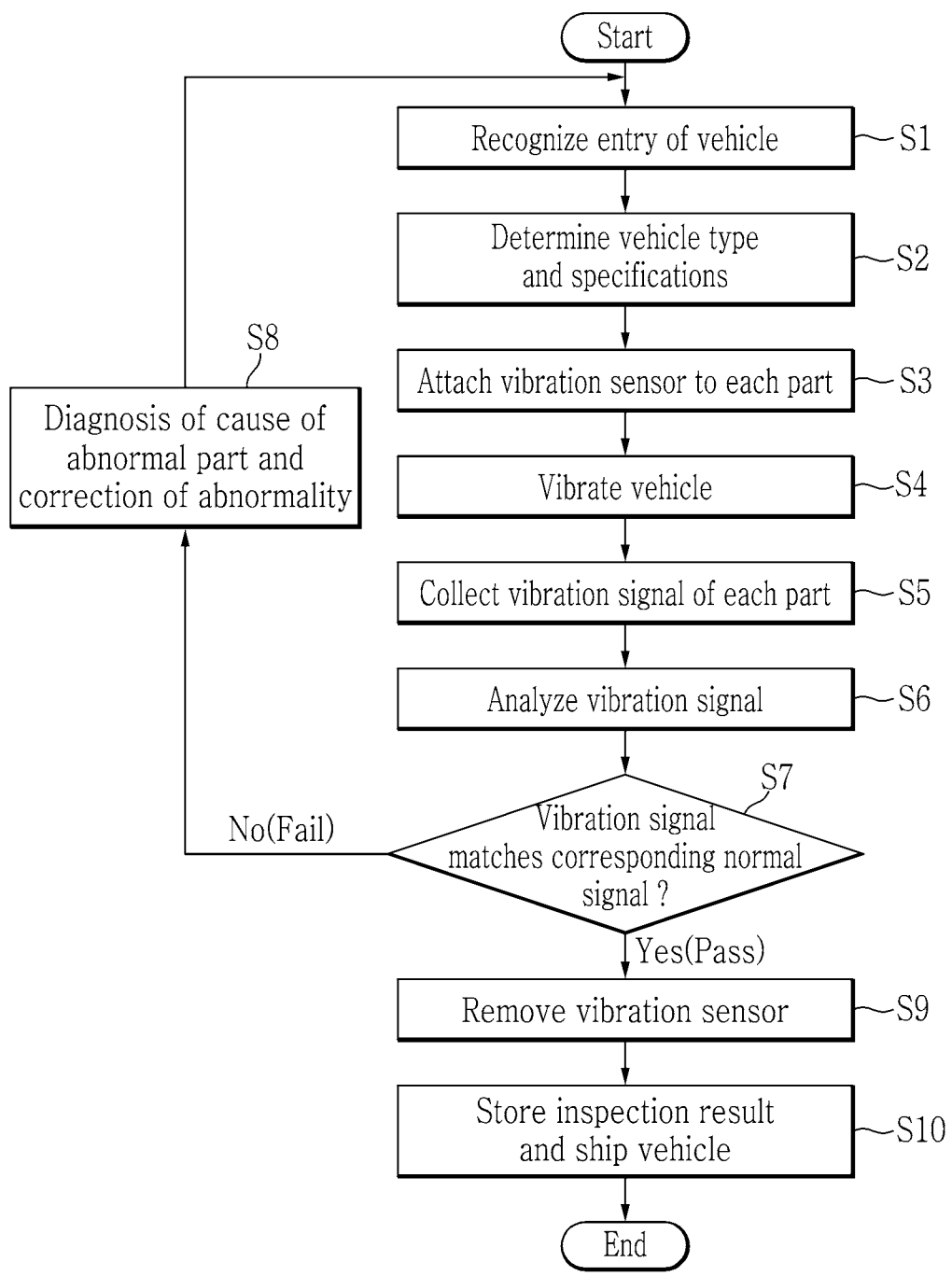
FIG. 4 is a flowchart schematically illustrating a method for vibration inspection of a vehicle according to various exemplary embodiments of the present invention.

FIG. 4 is a flowchart schematically illustrating a method for vibration inspection of a vehicle according to various exemplary embodiments of the present invention.

Referring to FIG. 4, the control unit 57 according to various exemplary embodiments of the present invention enters the inspection table 10 through the vehicle recognizer 40, receives a barcode or OBD-ID of a fixed vehicle, and recognizes the entry of the vehicle S1.

The control unit 57 determines the vehicle type and specifications of the entered vehicle based on the vehicle ID matched with the barcode or OBD-ID S2.

The control unit 57 controls the sensor detachable robot 20 of the multi-joint structure to attach the vibration sensor 21 to each part set according to the vehicle type and specifications of the vehicle S3. For example, the control unit 57 may attach the vibration sensor 21 to various parts such as steering part (STEERING), cab mounting part (CAB MTG), seat part (SEAT), door part (DOOR), frame part (FRAME), front axle part (FRT AXLE), rear axle part (RR AXLE), exhaust pipe part (EXHAUST), engine mounting part (ENGINE MTG), transmission mounting part (TM MTG), parking shaft part (P/SHAFT), etc. At this time, the control unit 57 may attach the vibration sensors 21 matched to the set parts through posture control for each sensor detachable robot 20 mounted around the inspection table 10 and return them to their original positions.

When the attachment of the vibration sensor 21 is completed, the control unit 57 controls the vibrating robot 30 having a multi-joint structure to bring the vibrator 31 into close contact with the vehicle. Then, the vibrator 31 is operated to vibrate the vehicle for vibration inspection S4.

The control unit 57 collects the vibration signal measured by the vibration sensor 21 during vibration of the vehicle S5. At this time, the control unit 57 classifies and stores the received vibration signal for each unique communication channel ch connected to the vibration sensor 21 attached to each part, and different vibration signals may be collected according to the natural vibration frequency characteristics for each part.

The control unit 57 analyzes the vibration signal for each unique communication channel and determines whether or not it matches the normal signal set for each part S6.

At this time, the control unit 57 determines that the quality inspection passes (Pass) if all vibration signals for each unique communication channel match the corresponding normal signal (S7; Yes). Then, the control unit 57 removes the vibration sensor 21 through the control of the sensor detachable robot 20 S9.

The control unit 57 matches and stores the inspection result history with the vehicle ID, and the vehicle is shipped from the inspection table 10 S10.

On the other hand, in the step S7, if an abnormal signal inconsistent with the corresponding normal signal is detected (S7; No), the control unit 57 determines that the inspection fails (Fail).

The control unit 57 detects an abnormal part in which an abnormal signal is generated through a unique communication channel ch of the abnormal signal. Then, the control unit 57 diagnoses a component belonging to the abnormal part and the cause of the abnormality based on the diagnosis data learned in advance through deep learning, and displays the diagnosis on the display unit 55 S8. Thereafter, the vibration inspection of the vehicle in which the abnormal state of the part is corrected may be resumed.

Figure 5:
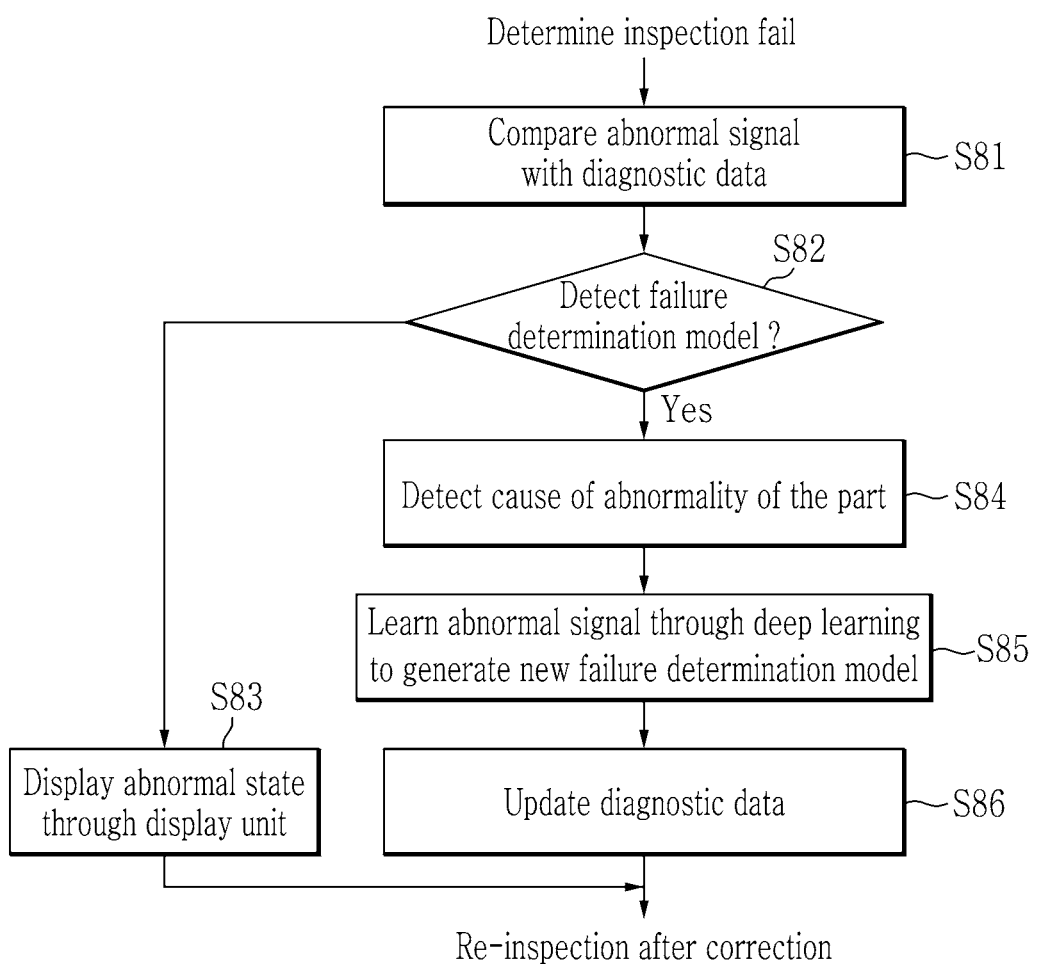
FIG. 5 is a subdivided view of a flow after an inspection failure in a vehicle vibration inspection method according to various exemplary embodiments of the present invention.

Meanwhile, FIG. 5 is a subdivided view of a flow after an inspection failure in a vehicle vibration inspection method according to various exemplary embodiments of the present invention.

Figure 6:
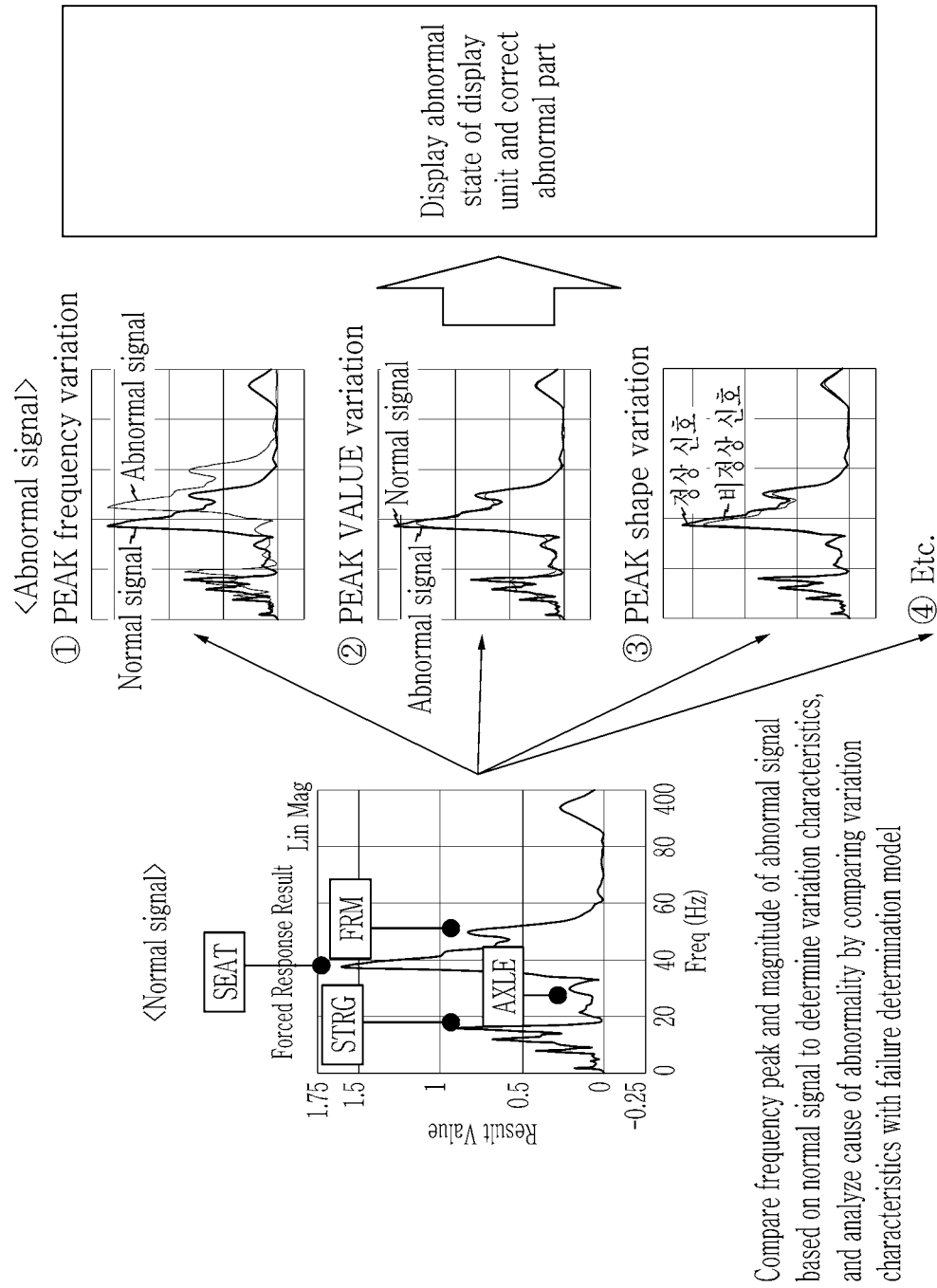
FIG. 6 shows an example of a method for analyzing a cause of an abnormal signal according to various exemplary embodiments of the present invention.

FIG. 6 shows an example of a method for analyzing a cause of an abnormal signal according to various exemplary embodiments of the present invention.

Referring to FIG. 5, as step S8 of FIG. 4 is subdivided, the control unit 57 compares the abnormal signal according to the failure of the vibration inspection result of the vehicle with the failure determination models of various cases previously established in the diagnostic data in the past S81.

For example, referring to FIG. 6, the control unit 57 compares a frequency peak and a magnitude of the abnormal signal based on the normal signal to determine the variation characteristics. Furthermore, the control unit 57 may analyze the cause of the abnormality by comparing frequency variation characteristics of the abnormal signal with failure determination models of various cases stored in the diagnostic data.

At the present time, when a failure determination model having a pattern same as or similar to the fluctuation characteristic of the abnormal signal is detected from the diagnostic data (S82; YES), the control unit 57 displays the abnormal state defined in the corresponding model through the display unit 55 S83. That is, the analyzed cause of abnormalities, such as the location of the part, failure, assembly defect, and system error, can be displayed to the operator through the display unit 55.

On the other hand, if a failure determination model having a pattern same as or similar to the fluctuation characteristic of the abnormal signal is not detected in the diagnostic data (S82; No), the control unit 57 detects a new cause of an abnormality of the part through the multi-joint structure/check of the operator S84.

The control unit 57 learns the abnormal signal through deep learning to generate a new failure determination model (S85), and updates diagnostic data in which the identified cause of the abnormality is defined S86.

Thereafter, the vehicle enters the repair process, corrects the abnormal state of the component, and then performs re-inspection.

In the above description, the vehicle vibration inspection method has been described mainly with the control unit 57, but the configuration of each unit including the control unit 57 may be integrated into a single inspection server 50. Therefore, it is obvious that the vehicle vibration inspection method can be described mainly with the inspection server 50.

Figure 7:
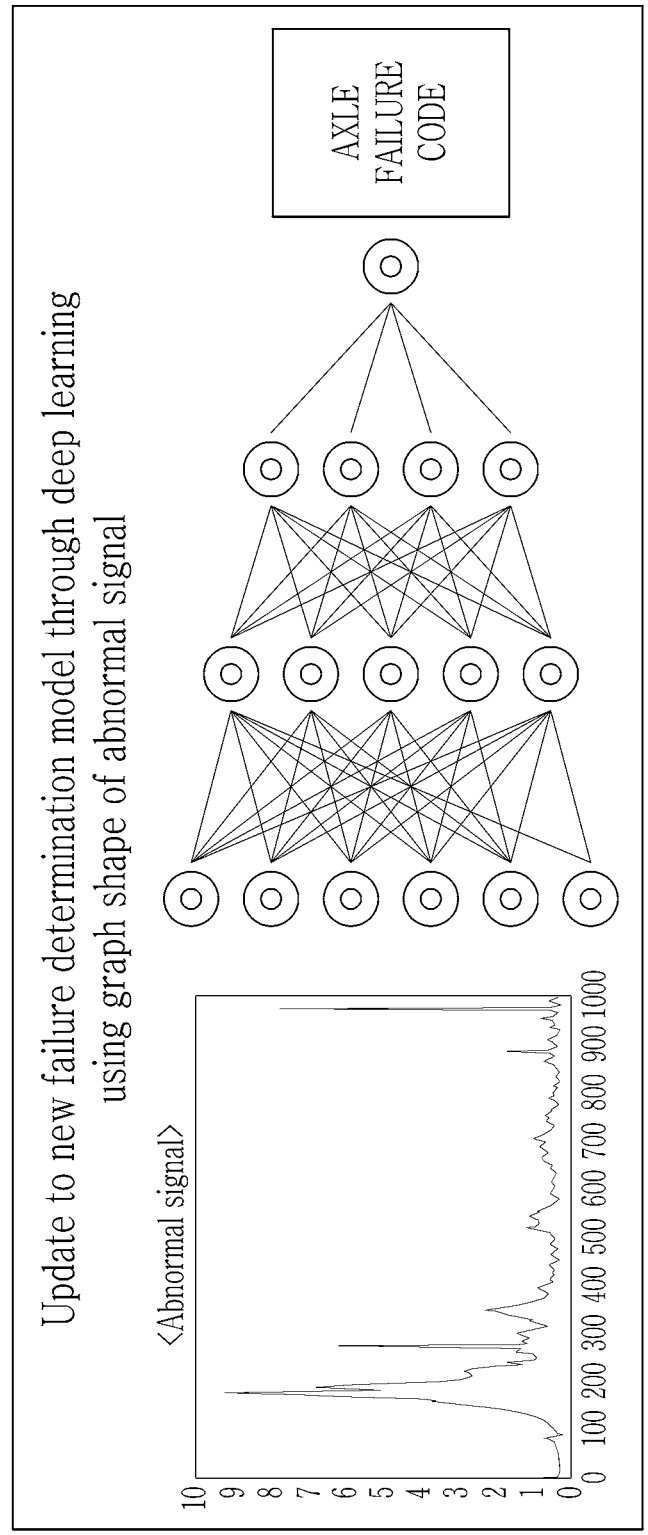
FIG. 7 shows a method of learning an abnormal signal through deep learning according to various exemplary embodiments of the present invention.

Meanwhile, FIG. 7 shows a method of learning an abnormal signal through deep learning according to various exemplary embodiments of the present invention.

Referring to FIG. 7, the control unit 57 may generate a failure code of a new failure determination model generated by learning a graph shape of the abnormal signal, a defective part, a cause of an abnormality, and a corrective measure thereof through a deep learning neural network. Furthermore, the control unit 57 may update a new failure determination model to diagnosis data to improve diagnosis performance and then utilize it for a diagnosis test of a vehicle.

Like this, according to various exemplary embodiments of the present invention, human errors due to automation of vehicle inspection may be prevented by measuring vibration signals by attaching vibration sensors to various parts of the vehicle through a multi-joint robot and detecting the analyzed abnormal state according to the natural vibration frequency characteristics of each part.

Furthermore, it is possible to improve diagnostic performance for abnormal situations in various cases for each part by updating the diagnosis data by learning new abnormal signals detected in the vehicle diagnostic test process through deep learning neural network learning.

Furthermore, comprehensive inspection of various parts applied by vehicle type is possible by performing customized vibration inspection set according to various vehicle types and specifications produced in the in-line process.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which various exemplary embodiments of the present invention pertains.

Furthermore, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for vibration inspection of a vehicle for inspecting a quality of the vehicle assembled in a vehicle factory's in-line, the system comprising:
    an inspection table for guiding and fixing the vehicle to a predetermined inspection position;
    a sensor detachable robot configured for attaching or detaching at least a vibration sensor to at least a part of the vehicle;
    a vibrating robot configured of generating vibration for the vibration inspection of the vehicle; and
    an inspection server that is configured to analyze a vibration signal received from the at least a vibration sensor during the vibration inspection of the vehicle, and to determine the vehicle to be in inspection pass when the vibration signal matches a normal signal set according to a natural vibration frequency characteristic of each part of the vehicle, and to determine the vehicle to be in inspection fail when the vibration signal does not match the normal signal,
    wherein the inspection server includes:
        an external interface unit of receiving the vibration signal for each predetermined communication channel connected to the at least a vibration sensor, including wired and wireless communication modules;
        a vehicle recognition unit of determining whether the vehicle is entered and a type and a specification of the entered vehicle's ID using a barcode or an On-board diagnostics (ODD)-ID received from a vehicle recognizer of the inspection table;
        a robot control unit of controlling the sensor detachable robot to attach the at least a vibration sensor to a part of the entered vehicle set according to the type and specification of the entered vehicle;
        a data setting unit configured to set a normal signal according to a natural vibration frequency characteristic of the part set for the type and the specification of the vehicle and reference data in which a range criteria thereof is defined;
        a display unit that provides an operator input menu (UI) to display a plurality of types of information generated according to the vibration inspection of the vehicle;
        a database unit (DB) for storing programs and data for the vibration inspection of the vehicle; and
        a control unit that is configured to detect an abnormal state of a component or a system of the vehicle in which an abnormal signal is generated for each predetermined communication channel, to diagnose a location and a cause of the component where the abnormal state has occurred, and to display the abnormal state on the display unit.

2. The system for the vibration inspection of claim 1, further including a vehicle recognizer configured for recognizing the barcode or the On-board diagnostics (OBD)-ID of the vehicle entering the inspection table and transmitting the recognized barcode or the OBD-ID to the inspection server.

3. The system for the vibration inspection of claim 1, wherein the inspection table includes access roads for guiding the vehicle to enter wheels of the vehicle and a stopper protruding from a front of the access roads to fix the wheels at a predetermined position, and wherein a plurality of sensor detachable robots is disposed around the inspection table.

4. The system for the vibration inspection of claim 3, wherein the inspection table further includes a space part formed below the access roads, and wherein the sensor detachable robot configured for attaching the at least a vibration sensor to the at least a part of the vehicle or detaching the at least a vibration sensor from the at least a part of the vehicle is disposed under the vehicle in the space part.

5. The system for the vibration inspection of claim 1, wherein the at least a vibration sensor is configured in plural and is attached to the vehicle through a magnet and is configured to measure the vibration signal of the at least a part.

6. The system for the vibration inspection of claim 5, wherein the at least a vibration sensor includes a three-axis acceleration sensor that is configured to measure the vibration signal in which the vehicle is vibrated upwards and downwards, back and forth, and left and right of the vehicle.

7. The system for the vibration inspection of claim 5, wherein the at least a vibration sensor has a wired or wireless communication means and transmits the measured vibration signal to the inspection server through each predetermined communication channel.

8. The system for the vibration inspection of claim 1, wherein the sensor detachable robot is configured to grip the at least a vibration sensor with tongs mounted on an end effector of the sensor detachable robot in a multi-joint structure, to attach the at least a vibration sensor to the at least a part of the vehicle through posture control of the sensor detachable robot, or to remove the at least a vibration sensor from the vehicle after the vibration inspection.

9. The system for the vibration inspection of claim 1, wherein the vibrating robot is configured to generate vibrations by vibrating a vibrator mounted on an end effector of a multi-joint structure on the vibrating robot in contact with the vehicle or hitting a part of the vehicle by a hammer mounted on the end effector of the vibrating robot.

10. The system for the vibration inspection of claim 1, wherein the robot control unit is configured for controlling the vibrating robot to make a vibrator be in contact with the vehicle and vibrates the vehicle via the vibrator.

11. The system for the vibration inspection of claim 1, wherein the control unit is configured to compare a frequency peak and a magnitude of the abnormal signal based on the normal signal to determine a frequency variation characteristics of the abnormal signal, and to compare the frequency variation characteristics of the abnormal signal with a failure determination model of a plurality of cases stored in diagnostic data to analyze a cause of abnormality of the component or the system.

12. The system for the vibration inspection of claim 11, wherein the control unit is configured to generate a new failure determination model by learning the abnormal signal with a deep learning neural network and to update the diagnostic data in which a new cause of abnormality is defined when the failure determination model having the pattern corresponding to the frequency variation characteristics of the abnormal signal is not detected in the diagnostic data.

13. A method for vibration inspection of a vehicle for inspecting a quality of the vehicle assembled in a vehicle factory's in-line, the method comprising:
 a) determining, by a controller, a type and a specification of the vehicle according to a vehicle ID recognized through a vehicle recognizer upon concluding that the vehicle enters an inspection table;
 b) controlling, by the controller, at least a sensor detachable robot having a multi-joint structure to attach at least a vibration sensor for each of parts of the vehicle set according to the type and the specification of the vehicle;
 c) controlling, by the controller, a robot having a multi-joint structure to make a vibrator be in contact with the vehicle and configured of vibrating the vibrator for the vibration inspection of the vehicle;
 d) analyzing, by the controller connected to the at least a vibration sensor, a vibration signal received from the at least a vibration sensor and determining the vehicle to be in inspection pass when the vibration signal matches a normal signal set according to a natural vibration frequency characteristic of each of the parts of the vehicle, and determining the vehicle to be in inspection fail when the vibration signal does not match the normal signal; and
 after the step d), e) detecting an abnormal part among the set parts through a predetermined communication channel in which an abnormal signal is received and displaying a diagnosis on a display unit according to a diagnosis data learned by deep learning in advance, wherein the diagnosis is performed for the abnormal part and a cause of an abnormality of the abnormal part based on the diagnosis data.

14. The method for the vibration inspection of claim 13, wherein the step b) includes attaching the at least a vibration sensor matched to the set parts through posture control for each of the at least a sensor detachable robot disposed around the inspection table and returning the at least a vibration sensor to an original position thereof.

15. The method for the vibration inspection of claim 13, wherein the step d) includes:
 classifying and storing the received vibration signal for each predetermined communication channel connected to the at least a vibration sensor attached to each of the parts when the vehicle vibrates; and
 analyzing the vibration signal for each predetermined communication channel to determine whether the vibration signal matches the normal signal set for each of the parts.

16. The method for the vibration inspection of claim 13, wherein in the step e), a fluctuation characteristic of the abnormal signal is determined by comparing a frequency peak and a magnitude of the abnormal signal based on the normal signal, and the cause of the abnormality is analyzed by comparing a frequency variation characteristics of the abnormal signal with failure determination models of a plurality of cases stored in the diagnostic data.

17. The method for the vibration inspection of claim 16, wherein the step e) includes displaying an abnormal state defined in a fault determination model among the fault determination models, through the display unit when a fault determination model having a pattern corresponding to the frequency variation characteristics of the abnormal signal is detected in the diagnostic data.

18. The method for the vibration inspection of claim 16, wherein the step e) includes:
- determining a new cause of an abnormality in a corresponding part of the vehicle through maintenance of the vehicle when a failure determination model having a pattern corresponding to the frequency variation characteristics of the abnormal signal is not detected in the diagnostic data; and
- learning the abnormal signal by deep learning to generate a new failure determination model, and updating the diagnostic data in which the new cause of the abnormality is defined.

* * * * *